(12) United States Patent
Steinebach

(10) Patent No.: US 6,687,026 B1
(45) Date of Patent: Feb. 3, 2004

(54) OPTICAL SCANNING APPARATUS WITH SWITCHABLE RESOLUTION

(75) Inventor: Wolfgang Steinebach, Salz (DE)

(73) Assignee: Thomas Licensing S.A., Boulogne (FR)

( * ) Notice: Subject to any disclaimer, the term of this patent is extended or adjusted under 35 U.S.C. 154(b) by 672 days.

(21) Appl. No.: 09/610,741

(22) Filed: Jul. 6, 2000

(30) Foreign Application Priority Data

Jul. 9, 1999 (EP) ............................................. 99113327

(51) Int. Cl.[7] .................................................. H04N 1/04
(52) U.S. Cl. ........................ 358/483; 358/474; 358/487; 250/208.1; 348/312; 348/315
(58) Field of Search ................................. 358/483, 482, 358/514, 487, 506, 513, 497, 496; 348/312, 315; 250/208.1

(56) References Cited

U.S. PATENT DOCUMENTS 5,579,526 A  11/1996  Watt ........................... 396/559

6,462,779 B1 * 10/2002  Philbrick .................... 348/312

FOREIGN PATENT DOCUMENTS

EP       0851658 A2    7/1998    ............ H04N/1/14

* cited by examiner

*Primary Examiner*—Cheukfan Lee
(74) *Attorney, Agent, or Firm*—Joseph S. Tripoli; Ronald H. Kurdyla; Joel M. Fogelson

(57) ABSTRACT

An optical sensor for a telecine application having a first group of odd sensor elements and a second group of even sensor elements where each sensor element is associated with a control electrode that controls the operation of the associated sensor element. An auxiliary control electrode is also associated with sensor elements of one of the two groups with a charge summing element being coupled to adjacent sensor elements assigned to the first and second group.

7 Claims, 3 Drawing Sheets

OPTICAL SCANNING APPARATUS WITH SWITCHABLE RESOLUTION

The invention relates to an optical scanning apparatus for scanning objects with a switchable resolution. The invention also relates to a circuit for an optical sensor with a switchable resolution.

BACKGROUND OF THE INVENTION

Optical Scanning devices are used to make an electronic image of an object, for example, in the form of digital data. Such an optical scanning device might be, for example, a scanner for a photocopying machine or a fax machine, a so-called scanner to plug to a computer system for scanning papers and photographs or a telecine for scanning images in a film.

One of the most important performance parameters is the resolution of the scanning system. For telecines high-resolution systems become ever more important, especially in high-end postproduction applications which use the scanned data for sizing, zooming, multilayering in High Definition TV or data application.

The front end of a telecine is the first and most important subsystem, which is used to convert the optical information contained in the film into electric signals that can be processed by various signal processors. As a key element, the optical and electrical quality of this scanning system determines the maximum available quality of the electrical output, either digital or analog, TV standard or data format.

One restriction of currently available telecines is scanning speed versus scanned resolution. Standard resolution systems, such as the Quadra telecine, a product of Philips Digital Video systems, uses lower resolution scanners in order to provide speeds of up to 30 frames/sec., while high-resolution systems often operate at speeds down to one frame/sec. or even less.

Depending on the chosen technique, telecines utilize different types of scanning devices. A preferred scanning device uses an optical sensor built up of charge-coupled devices. There are charge-coupled devices which transfer the charge of 'odd' and, 'even' pixels to two different shift registers. As both shift registers can operate at half the pixel rate, the processing clock frequencies and the bandwidth of the analog processing can be halved, compared to common charge-coupled devices which have only a single line shift register.

SUMMARY OF THE INVENTION

It is an object of the invention to provide a given resolution at a maximum scanning speed.

This object is achieved by using summing means for eventually summing the contents of two adjacent pixels.

In a low-resolution mode every two adjacent pixels are added together. Therefore, the sum has a better signal-to-noise ratio and can be processed twice as fast without losing signal quality. This means that with up-to-date circuits, real-time scanning with 30 frames/sec. can be performed. Due to the worse signal-to-noise ratio in high-resolution mode, where each pixel has to be processed separately without being summed, the scanning speed has to be halved. Neither the less low-resolution scanning nor high-resolution scanning can be carried out by the same sensor. This helps to minimize costs.

Many high-resolution applications, such as data transfer and processing with a workstation, do not need the speed of 30 frames/sec., while lower resolution applications need the scanning in real-time mode. The described arrangement gives both high-speed (<30 frames/sec.) standard resolution and lower speed (<15 frames/sec.) high-resolution scanning.

DETAILED DESCRIPTION OF THE PREFERRED EMBODIMENTS

Figure 1:
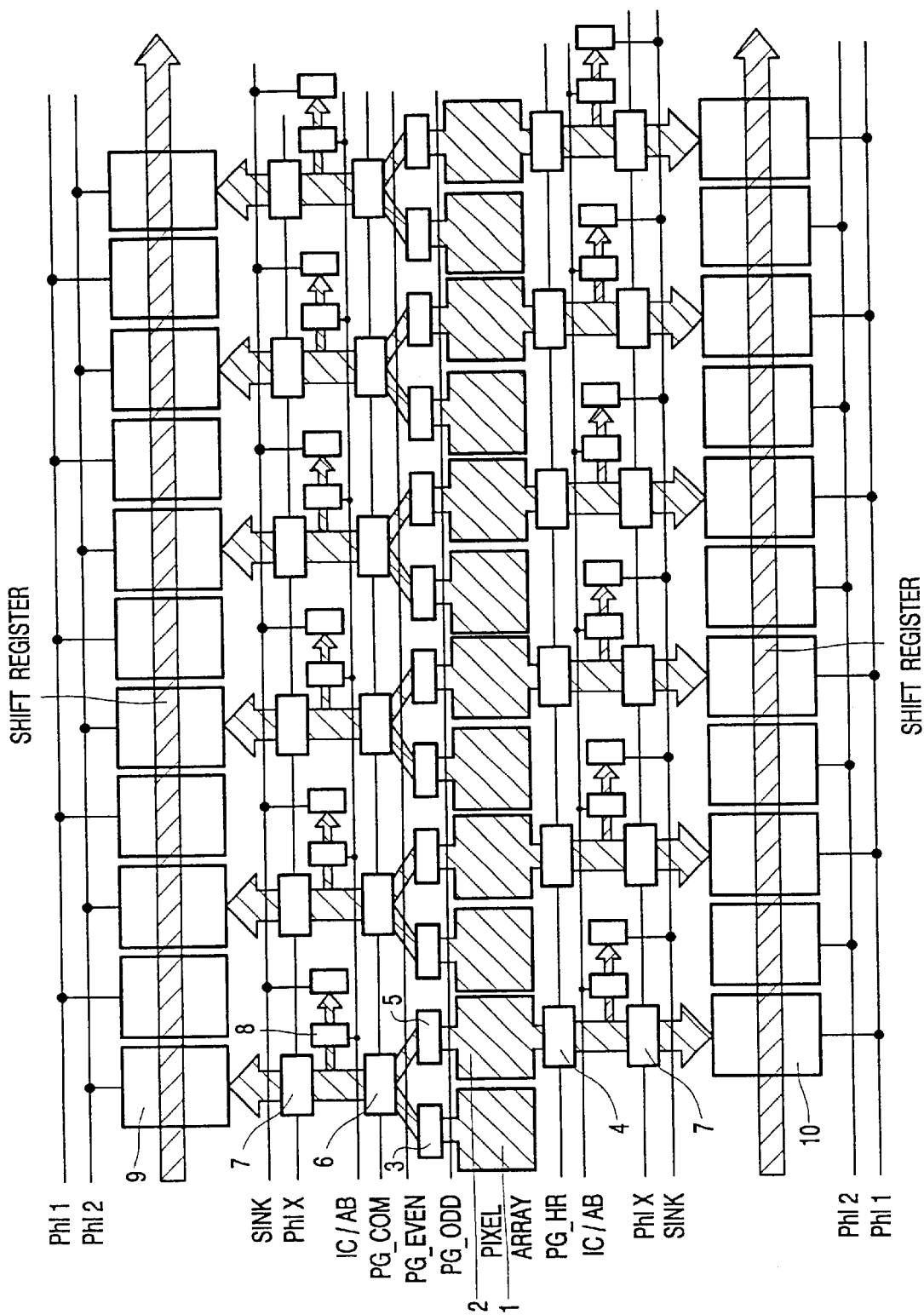
FIG. 1 shows a first embodiment of the invention based on a common CCD line sensor architecture with two separate shift registers for odd and even pixels.

FIG. 1 shows an embodiment of the invention based on a common CCD line sensor architecture with two separate shift registers for odd and even pixels. In known practice each odd pixel sensor 1 is connected to photo gates 3 called "odd photo gates" here on one side of the pixel sensor area and each even photo sensor area is connected to photo gates 4 called "even photo gates" here on the opposite side of the pixel sensor area. Additionally to that known architecture in this embodiment, auxiliary photo gates 5 are connected on the same side of the even pixel sensor areas 2 where the odd photogates 3 are located for the odd pixel area sensors 1. The photogates are in an insulated state when the pixel sensors are collecting the charge during integration time. To read out the charge of each pixel sensor area the three different photogates could independently of each other be set to a conductive state by a control signal. The output of an odd photogate 3 and that of an adjacent auxiliary photogate 5 are connected to charge summing means 6. The output of each charge summing means 6 is connected to a transfer gate 7 and a discharge gate 8. The outputs of the even photogates 4, as they are not connected to charge summing means, are connected directly to a transfer gate 7 and antiblooming gate 8 each. The outputs of the transfer gates 7 are connected each to one of the registers of the odd and even shift registers 9, 10.

In the high-resolution mode, when integration time has been completed and after the charge of a previous integration period has been read out, the odd and the even photogates 3, 4 are set to the conductive state by clocks PG_ODD and PG_HR respectively. The auxiliary photo gates 5 are not used. Therefore, the only charge to be summed in the charge summing means 6 is the charge of the odd pixel sensors 1. A transfer pulse Phi X is applied to the transfer gates 7 to transport the respective charges to the associated registers of the shift registers 9, 10. At clock signals Phi1, Phi2 the charges of the shift registers 9, 10 are shifted towards the outputs of the shift registers 9, 10. Afterwards, the antiblooming gates 8 are opened by a clock signal IC/AB to drain the charge which is generated in excess and which could not be handled by the charge-coupled device. Thus this arrangement works in the high-resolution mode like a common charge-coupled device with two shift registers 9, 10.

In the low-resolution mode clocks PG_ODD and PG_EVEN are used to control the odd and the auxiliary gates 3, 5. In contrast to the high-resolution mode the clock PG_HR for the even photo gates 4 is inactive. By this the charges of each pair of adjacent pixel sensors 1, 2 are summed by the charge summing means 6. In the low-resolution mode therefore two adjacent pixels act like one pixel, having the area of both pixels.

In this way the described charge-coupled device is capable of switching its pixel size and pixel number to deliver a "normal" resolution scan and a "double" resolution scan.

Figure 2:
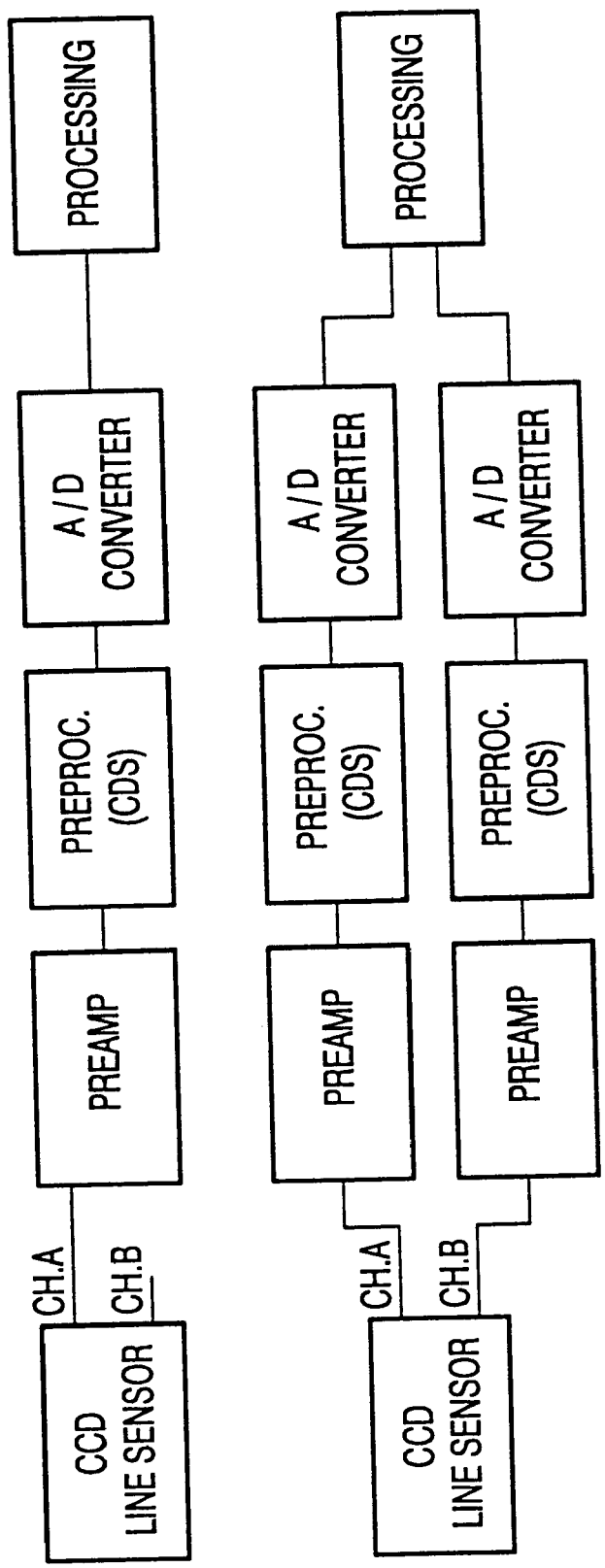
FIG. 2 shows the block diagram of an arrangement for processing the different output signals of the above described charged-coupled device.

FIG. 2 shows the block diagram of an arrangement for processing the different output signals of the above described charged-coupled device. In a standard resolution application, the scanner is used with 1024 pixels, shifted out at a low data rate of e.g. 30 Mhz. Standard single channel processing technique can be used for processing. In a high-resolution application, the scanner is switched to twice the resolution, i.e. 2048 pixels. In this case the scanner delivers two channels per line, odd and even pixel, each at the same data rate of e.g. 30 Mhz. Two ways of processing are possible: either the two channels of each color are processed separately during which the high-speed scanning (like in standard resolution) is possible. This mode of operation needs 6 instead of 3 processing channels, and gives only half the overhead of light level. In a second mode, the odd/even pixels are demultiplexed into a single data stream with the same data rate as a single technique and a high-resolution picture can be scanned at half the line rate compared to the low-resolution scanning. In the vertical scanning direction, the increase of resolution is automatically performed by the halved frame rate, which also doubles the integration time, so that the same light level overhead is reached as with standard resolution.

Figure 3:
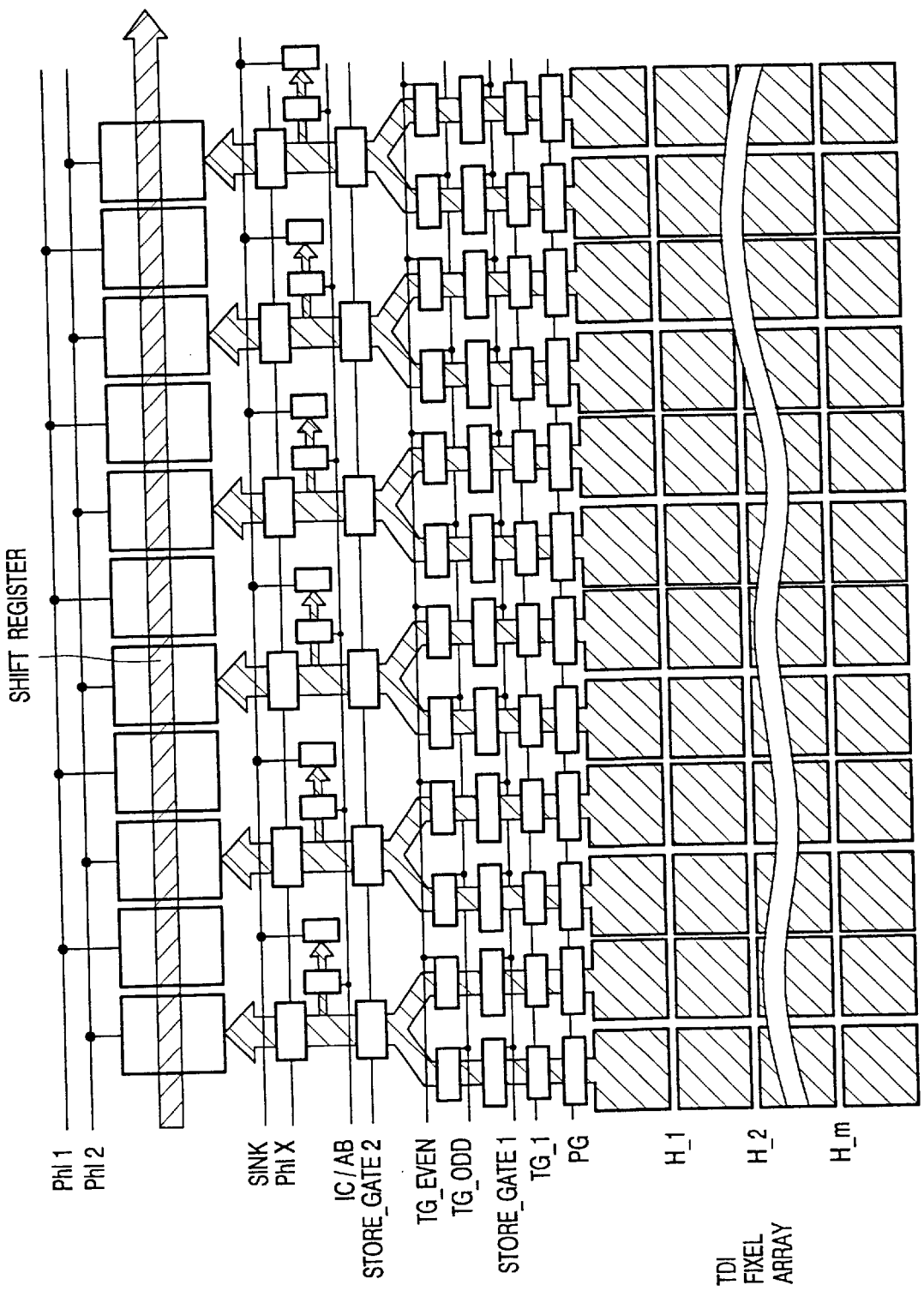
FIG. 3 shows another embodiment which could be used in combination with TDI CCD sensors.

FIG. 3 shows another embodiment which could be used in combination with TDI CCD sensors. In this embodiment the charge of two neighboring pixels is stored after the integration period first in an intermediate charge store (STOR_GATE1). In a charge summing mode, the two transfer registers TG_ODD and TG_EVEN are clocked simultaneously, the charge is summed and shifted to STORE_GATE2. From here it can be transferred to the shift register. In the high-resolution mode, first only TG_ODD shifts the charge to STORE_GATE2, where it remains until the next shift to the shift register occurs. While the odd pixels are read out, the charge from the even pixels is now transferred to the STORE_GATE2, and after reading out of the odd pixels, the even pixels are transferred to the shift register to be read out. Therefore, in the high-resolution mode, this architecture provides first all odd and then all even pixels. This allows high-resolution scanning at half the horizontal frequency of low-resolution scanning, while the shift clock frequency remains the same.

What is claimed is:

1. An optical sensor comprising at least one linear array of sensor elements grouped in a first and a second group containing odd and even sensor elements, respectively, each sensor element being associated with a control electrode controlling the operation of the individual sensor element, the sensor elements of one group being additionally associated with an auxiliary control electrode controlling the operation of the individual sensor element, and a charge summing means coupled to adjacent sensor elements assigned to the first and to the second group, respectively, wherein the coupling is achieved by the control electrode and the auxiliary control electrode, respectively.

2. An optical sensor according to claim 1, wherein the optical sensor is a charge coupled device (CCD).

3. An optical sensor according to claim 1, wherein the optical sensor comprises two output paths, wherein for a first operating mode, one output path provides representations of the measurement values of the first group of sensor elements, and the other output path provides representations of the measurement values of the second group of sensor elements, respectively, and for a second operating mode the one output path is inoperative whereas the other output path provides representations of the summed measurement values of the two adjacent sensor elements assigned to the first and second group, respectively.

4. An optical sensor according to claim 3, wherein the optical sensor provides half the spatial resolution in the second operating mode compared to the spatial resolution in the first operating mode.

5. An optical sensor according to claim 1, wherein the optical sensor additionally comprises a field of sensor elements.

6. A film scanner equipped with the optical sensor according to claim 1.

7. An optical sensor according to claim 1, wherein each control electrode is part of a respective photo gate element.

* * * * *